United States Patent [19]

Ikegami et al.

[11] 4,160,227
[45] Jul. 3, 1979

[54] THERMISTOR COMPOSITION AND THICK FILM THERMISTOR

[75] Inventors: Akira Ikegami; Hiromi Tosaki; Jun Yamada; Teruo Mozume, all of Yokohama; Ichiro Tsubokawa, Fujisawa; Kiyoshi Sakashita, Yokohama, all of Japan

[73] Assignee: Hitachi, Ltd., Tokyo, Japan

[21] Appl. No.: 778,954

[22] Filed: Mar. 18, 1977

[51] Int. Cl.² .............................................. H01C 7/10
[52] U.S. Cl. ................................. 338/22 R; 252/514; 338/23
[58] Field of Search ................ 252/514; 338/23, 22 R

[56] References Cited

U.S. PATENT DOCUMENTS

| | | | |
|---|---|---|---|
| 2,274,592 | 2/1942 | Dearborn ........................ 252/519 |
| 3,015,633 | 1/1962 | Humbert et al. ................ 252/519 |
| 3,408,311 | 10/1968 | Short ............................... 252/514 |
| 3,450,545 | 6/1969 | Ballard et al. ................ 252/514 X |
| 3,477,055 | 11/1969 | Herbst et al. ..................... 338/22 |
| 3,573,229 | 3/1971 | Herbst et al. ................... 252/514 |
| 3,679,606 | 7/1972 | Short ............................... 252/514 |
| 4,051,074 | 9/1977 | Asada ............................... 252/514 |

*Primary Examiner*—Herbert B. Guynn
*Attorney, Agent, or Firm*—Craig and Antonelli

[57] ABSTRACT

This specification discloses a thermistor composition comprising a thermistor characteristic powder, a bismuth containing borosilicate glass frit and an electrically conductive powder comprising a mixture of a noble metal powder and ruthenium oxide powder which is selected from $RuO_2 + Ag$ and $RuO_2 + Au$ wherein the mixing ratio of the metal oxide thermistor characteristic powder, the glass and the electrically conductive powder is in the area of the quadrilateral ABCD in the triangular diagram of the accompanying FIG. 1 and the amount of the ruthenium oxide powder is 15-95% by weight of total of the noble metal powder and the ruthenium oxide powder, the vertexes A, B, C and D of the quadrilateral ABCD being the points showing the following compositions:

| | The metal oxide thermistor characteristic powder (% by weight) | Sum of the amounts of the noble metal powder and the ruthenium oxide powder (% by weight) | Glass frit (% by weight) |
|---|---|---|---|
| A | 20 | 10 | 70 |
| B | 70 | 10 | 20 |
| C | 30 | 50 | 20 |
| D | 20 | 50 | 30 |

This specification further discloses a thick film thermistor using said thermistor composition.

10 Claims, 2 Drawing Figures

THERMISTOR COMPOSITION AND THICK FILM THERMISTOR

BACKGROUND OF THE INVENTION

1. Field of the Invention

This invention relates to an element suitable for carrying out the temperature sensing by the changes of resistivity with changes of temperature (said element is referred to as "thermistor" hereinafter) and more particularly it relates to a thermistor composition capable of providing a thermistor in which a resistivity in the range of 1Ω-1MΩ can be obtained, dispersion of resistivity is within ±15%, voltage-dependence of resistivity, namely, varistor constant is 1.00–1.05, current noise is 2% or less and resistivity aging characteristic is 2% or less, and furthermore, this invention relates to a thick film thermistor prepared using said composition.

2. Description of the Prior Art

Heretofore, thick film thermistors have been produced, in the same manner as in the production of general thick film elements, by preparing a thermistor paste from a mixture of a complex oxide powder of traditional metals such as nickel, manganese, cobalt and the like which has thermistor characteristic, and shows change of resistivity with changes of temperature (said powder will be referred to as "thermistor characteristic powder" hereinafter), a glass frit and an organic vehicle. Said thick film thermistors, however, have various defects, namely, (1) low resistivity of less than 1 kΩ cannot be obtained, (2) resistivity greatly changes with changes of thickness of thermistor film and dispersion of resistivity is very large, i.e., ±30%, (3) voltage-dependence of resistivity is high, i.e., varistor constant is about 1.10, (4) current noise is high, i.e., about 10%, (5) resistivity aging characteristic is more than 5%, etc. Thus, thick film thermistor excellent in aging characteristic and high in accuracy cannot be obtained unless all of these defects have been removed.

As the result of researches on various materials, the said defects (1)–(4) have been eliminated by the addition of noble metal powder, especially, silver and palladium as the third component, but it is still necessary to search for the materials capable of improving the resistivity aging characteristic as mentioned in the above (5).

SUMMARY OF THE INVENTION

Accordingly, the object of this invention is to provide a thermistor composition suitable for obtaining a thick film thermistor which has no defects as enumerated above and which is excellent in aging characteristic and high in accuracy and furthermore to provide the thick film thermistor obtained therefrom.

As the results of the inventor's various researches on thermistor composition, it has been found that said object of this invention can be achieved by the addition of a mixture of ruthenium oxide powder and silver powder or ruthenium oxide powder and gold powder as the third component to thermistor characteristic powder and glass frit (bismuth-containing lead borosilicate glass frit). That is, this invention is characterized by a thermistor composition comprising a thermistor characteristic powder, a glass frit (bismuth-containing lead borosilicate glass frit) and a mixture of ruthenium oxide powder and silver powder or ruthenium oxide powder and gold powder wherein the thermistor characteristic powder is 20–70% by weight, the glass frit is 70–20% by weight and the ruthenium oxide powder and the noble metal powder are 10–50% by weight and the amount of the ruthenium oxide powder is 15–95% by weight of the sum of the ruthenium oxide powder and the noble metal powder. The thick film thermistor produced from said composition has a resistivity of 1Ω-1MΩ, a varistor constant of 1.00–1.05 and a current noise of 2% or less and dispersion of the resistivity being within ±15% and resistivity aging characteristic being 2% or less. Thus, said thick film thermistor has an excellent aging characteristic and a high accuracy.

Next, the materials used in this invention will be explained below.

The metal oxide powder having the thermistor characteristic is preferably complex oxide of traditional metals such as nickel, cobalt, manganese and the like. The glass frit is preferably bismuth-containing lead borosilicate glass which desirably has the composition shown in Table 1. The electrically conductive powder is a mixture of ruthenium oxide powder and noble metal powder, specifically a mixture of ruthenium oxide powder and silver powder or a mixture of ruthenium oxide powder and gold powder. The amount of the powder having thermistor characteristic is limited to 20–70% by weight of the total amount of powders because when the amount of the thermistor characteristic powder is less than 20% by weight, resistivity does not change with change of temperature and thermistor constant is less than 500 K to lose utility value as a thermistor and when the amount of the thermistor characteristic powder is more than 70% by weight the contents of glass frit, ruthenium oxide, silver and the like are below those required for obtaining the desired characteristics. The amount of the electrically conductive powder comprising ruthenium oxide and silver or gold is limited to 10–50% by weight because when it is more than 50% by weight metallic conduction takes place to show nearly no change of resistivity with change of temperature and when less than 10% by weight the effect of adding the electrically conductive powder is not exhibited, dispersion of resistivity is greater than ±15%, varistor constant which indicates voltage-dependence of resistivity is more than 1.05 and current noise is higher than 2%.

Furthermore, the amount of the glass frit is limited to 20–70% by weight because when it is more than 70% by weight a resistivity of lower than 1 MΩ cannot be obtained and the varistor constant is more than 1.05 to lose utility value as a thermistor and when less than 20% by weight adhesive strength between the powders and between substrate and the powders decreases to result in problems in production.

The amount of the ruthenium oxide powder is limited to 95–15% by weight of the electrically conductive powder because when it is more than 95% by weight or less than 15% by weight the voltage-dependence of resistivity, namely, varistor constant is more than 1.05.

DETAILED DESCRIPTION OF PREFERRED EMBODIMENTS

The following examples illustrate this invention.

EXAMPLE 1

A thermistor characteristic powder prepared by solid phase reaction of $MnO_2$, CoO and NiO in a molar ratio of 2:1:3, a glass frit having the composition of Table 1, ruthenium oxide powder and silver powder were weighed in the various ratios as shown in Table 2 and in the total amount of 10 g and they were mixed by a mixing and grinding machine for one hour. Then, 4cc of α-terpineol solution containing 10% of ethyl cellulose as a vehicle was added to each of the mixtures and each mixture was kneaded for additional one hour to obtain thermistor pastes.

Table 1

| Composition of the glass frit (% by weight) | | | | | | |
|---|---|---|---|---|---|---|
| $SiO_2$ | PbO | $B_2O_3$ | BaO | CaO | $Bi_2O_3$ | $Al_2O_3$ |
| 24 | 23 | 20 | 15 | 8 | 6 | 4 |

Figure 2:
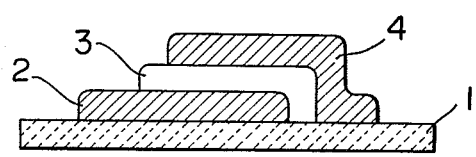
FIG. 2 is a cross sectional view of the thick film thermistor.

A silver palladium electroconductive paste was printed by screen printing method on alumina substrate 1 shown in FIG. 2 and this was fired at 850° C. for 10 minutes to obtain lower electrode 2. Said thermistor paste was printed on said electrode 2 and this was dried at 130° C. for 10 minutes to obtain thermistor layer 3. Then, a silver palladium electroconductive paste was printed thereon so that this overlapped the lower electrode through the thermistor layer 3. This was fired at 800° C. for 10 minutes to form upper electrode 4. Thus, a thick film thermistor of sandwich structure was produced. The overlap of the lower and upper electrodes, namely, effective surface area was 9 mm² and thickness of the thermistor layer after firing was 40 μm. Characteristics of thus obtained thick film thermistor are shown in Table 2.

In Table 2, the current noise δ is obtained from the following formula:

$$\delta = 100 \times \frac{\Delta i}{\frac{1}{R_o}} = 100 R_o \Delta i \ (\%)$$

wherein Δi is fluctuation of current in Amp. when 1 VD.C was applied to a thermistor having a resistivity $R_o(\Omega)$ at no load.

The resistivity aging characteristic is changing rate when the thermistor is left to stand at 150° C. for 1000 hours.

Figure 1:
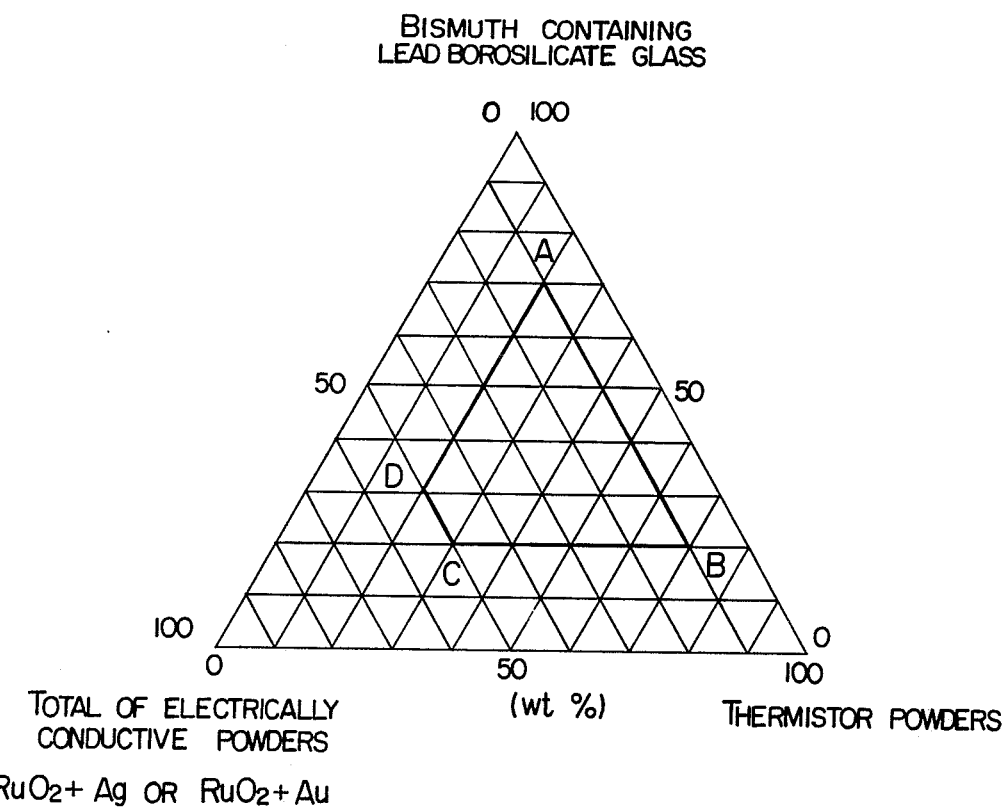
FIG. 1 is a triangular diagram illustrating the range of mixing ratio of the thermistor characteristic powder, the glass frit and the mixture of ruthenium oxide powder and noble metal powder according to this invention.

In the case of sample No. 3, 6, 7, 8, 11, 12, 13, 15, 16 and 17, in other words, when the mixing ratio of the thermistor characteristic powder, the glass frit and the mixture of silver powder and ruthenium oxide powder was in the area of the quadrilateral ABCD in the triangular diagram of FIG. 1 and when the amount of ruthenium oxide powder was in the range of 15–95% by weight of the sum of silver powder and ruthenium oxide powder, resistivity of the thick film thermistors was 1Ω–1MΩ, dispersion of the resistivity was within ±15%, varistor constant was 1.00–1.05, current noise was 2% or less and resistivity aging characteristic was 2% or less.

Sample No. 1 had smaller amount of the thermistor characteristic powder and thermistor constant of this sample was small. Moreover, this sample had higher glass content and so the resistivity of this sample was high and the varistor constant and current noise were also great. Sample No. 2 was low in content of the thermistor characteristic powder and thermistor constant of this sample was small. Sample No. 4 was low in contents of $RuO_2$ and Ag and varistor constant and current noise of this sample was great and the resistivity aging characteristic was also great. Sample No. 5 was low in content of the thermistor characteristic powder and thermistor constant of this sample was small. Sample No. 9 was low in contents of $RuO_2$ and Ag and varistor constant and current noise were great and moreover the resistivity aging characteristic was also great. Sample No. 10 was low in content of the thermistor characteristic powder and high in contents of $RuO_2$ and Ag and thermistor constant of this sample was zero. Sample No. 14 was high in contents of $RuO_2$ and Ag and thermistor constant of this sample was small. Sample No. 18 was low in contents of $RuO_2$ and Ag and varistor constant and current noise of this sample were great and resistivity aging characteristic was great. Sample No. 19 and 20 were low in content of glass and adhesive strength between powders was small and so there was problem in production.

Table 2

| No. | Composition of thermistor powder (% by weight) | | | | Resistivity R (Ω) at 25° C. | Dispersion of resistivity (%) | Thermistor constant B(K) | Varistor constant n | Current noise δ (%) | Resistivity aging characteristic (%) |
|---|---|---|---|---|---|---|---|---|---|---|
| | Thermistor characteristic powder | $RuO_2$ | Ag | Glass frit | | | | | | |
| 1 | 10 | 9 | 1 | 80 | 8.0M | 30 | 40 | 1.07 | 6.0 | 2.0 |
| 2 | 10 | 16 | 4 | 70 | 1.0M | 20 | 18 | 1.06 | 5.1 | 1.9 |
| 3 | 20 | 7 | 3 | 70 | 2.0M | 15 | 800 | 1.05 | 2.0 | 1.6 |
| 4 | 25 | 3 | 2 | 70 | 2.5M | 25 | 1500 | 1.08 | 10.0 | 4.5 |
| 5 | 10 | 20 | 20 | 50 | 200 | 13 | 10 | 1.00 | 2.0 | 1.0 |
| 6 | 20 | 12 | 18 | 50 | 3.0K | 15 | 750 | 1.00 | 1.5 | 1.1 |
| 7 | 40 | 3 | 7 | 50 | 10K | 15 | 3600 | 1.00 | 1.2 | 1.8 |
| 8 | 30 | 6 | 24 | 40 | 250 | 12 | 3400 | 1.00 | 1.0 | 1.9 |
| 9 | 55 | 4 | 1 | 40 | 7.0K | 23 | 3500 | 1.08 | 8.0 | 6.0 |
| 10 | 10 | 48 | 12 | 30 | 5 | 10 | 0 | 1.00 | 0.2 | 1.5 |
| 11 | 20 | 35 | 15 | 30 | 20 | 10 | 900 | 1.00 | 0.8 | 1.4 |
| 12 | 40 | 18 | 12 | 30 | 200 | 12 | 3450 | 1.00 | 0.7 | 1.4 |
| 13 | 60 | 5 | 5 | 30 | 4.0K | 15 | 3500 | 1.04 | 1.2 | 1.2 |
| 14 | 20 | 24 | 36 | 20 | 3 | 10 | 200 | 1.00 | 0.1 | 1.0 |
| 15 | 30 | 15 | 35 | 20 | 5 | 12 | 2800 | 1.00 | 0.3 | 1.8 |
| 16 | 50 | 6 | 24 | 20 | 60 | 10 | 3000 | 1.03 | 0.7 | 2.0 |
| 17 | 70 | 9 | 1 | 20 | 500 | 15 | 3600 | 1.05 | 1.1 | 2.0 |
| 18 | 75 | 4 | 1 | 20 | 1.0K | 18 | 3500 | 1.06 | 10.0 | 5.0 |

Table 2-continued

| No. | Composition of thermistor powder (% by weight) | | | | Resistivity R (Ω) at 25° C. | Dispersion of resistivity (%) | Thermistor constant B(K) | Varistor constant n | Current noise δ (%) | Resistivity aging characteristic (%) |
| | Thermistor characteristic powder | RuO₂ | Ag | Glass frit | | | | | | |
|---|---|---|---|---|---|---|---|---|---|---|
| 19 | 40 | 35 | 15 | 10 | 1 | 10 | 2800 | 1.00 | 1.0 | 1.4 |
| 20 | 70 | 12 | 8 | 10 | 300 | 15 | 3800 | 1.02 | 1.6 | 1.8 |

EXAMPLE 2

Table 3 shows compositions and various characteristics of thick film thermistors produced in the same manner as in Example 1 except that thermistor characteristic powder of MnO₂, CoO and NiO in a molar ratio of 2:3:1 was used. In the case of sample No. 1, 3, 4, 6, 8, 9 and 10, namely, when the mixing ratio of the thermistor characteristic powder, the glass frit and the mixture of silver powder and ruthenium oxide powder and the mixing ratio of the silver powder and the ruthenium oxide powder were in the same ranges as refered to in Example 1, the same effects as in Example 1 were obtained.

Sample No. 2 was low in content of the thermistor characteristic powder and thermistor constant of this sample was small. Sample No. 5 was low in contents of RuO₂ and Ag and varistor constant and current noise of this sample were great. Resistivity aging characteristic of this sample was great. Sample No. 7 was high in contents of RuO₂ and Ag and thermistor constant of this sample was small.

were produced therefrom in the same manner as in Example 1. Relations between the compositions and the various characteristics of thus obtained thermistors are shown in Table 4.

Even when the silver powder in the compositions of Example 1 was replaced with gold powder, in the case of sample No. 1, 3, 4, 6, 8, 9 and 10, namely, when the mixing ratio of the thermistor characteristic powder, the glass frit and the mixture of gold powder and ruthenium oxide powder was in the area of the quadrilateral ABCD in the triangular diagram of FIG. 1 and when the amount of ruthenium oxide powder was in the range of 15-95% by weight of the sum of the gold powder and the ruthenium oxide powder, resistivity of the thick film thermistors was 1Ω-1MΩ, dispersion of the resisitivity was within ±15%, varistor constant was 1.00-1.05, current noise was 2% or less and resistivity aging characteristic was 2% or less as in Example 1.

Sample No. 2 was low in content of the thermistor characteristic powder and thermistor constant of this sample was small. Sample No. 5 was low in contents of RuO₂ and Au and varistor constant and current noise Table 3

| No. | Composition of thermistor powder (% by weight) | | | | Resistivity R (Ω) at 25° C. | Dispersion of resistivity (%) | Thermistor constant B (K) | Varistor constant n | Current noise δ (%) | Resistivity aging characteristic (%) |
| | Thermistor characteristic powder | RuO₂ | Ag | Glass frit | | | | | | |
|---|---|---|---|---|---|---|---|---|---|---|
| 1 | 20 | 7 | 3 | 70 | 500K | 15 | 2800 | 1.03 | 1.8 | 2.0 |
| 2 | 10 | 20 | 20 | 50 | 2.0K | 12 | 50 | 1.00 | 1.5 | 1.2 |
| 3 | 20 | 12 | 18 | 50 | 5.0K | 14 | 1500 | 1.00 | 1.3 | 1.0 |
| 4 | 40 | 3 | 7 | 50 | 10K | 15 | 3400 | 1.00 | 1.0 | 1.6 |
| 5 | 55 | 4 | 1 | 40 | 3.0K | 21 | 3450 | 1.09 | 5.0 | 4.0 |
| 6 | 20 | 35 | 15 | 30 | 150 | 10 | 1000 | 1.00 | 0.5 | 1.5 |
| 7 | 20 | 24 | 36 | 20 | 4 | 10 | 40 | 1.00 | 0.1 | 1.0 |
| 8 | 30 | 15 | 35 | 20 | 8 | 12 | 800 | 1.00 | 0.2 | 1.2 |
| 9 | 50 | 6 | 24 | 20 | 300 | 10 | 3500 | 1.02 | 1.3 | 2.0 |
| 10 | 70 | 9 | 1 | 20 | 600 | 17 | 3600 | 1.03 | 1.0 | 2.0 |

EXAMPLE 3

Gold powder was added to the thermistor characteristic powder, the glass frit and the ruthenium oxide powder used in Example 1 and thick film thermistors were great. Moreover, resistivity aging characteristic was great. Sample No. 7 was high in contents of RuO₂ and Au and thermistor constant of this sample was small.

Table 4

| No. | Composition of thermistor powder (% by weight) | | | | Resistivity R (Ω) at 25° C. | Dispersion of resistivity (%) | Thermistor constant B (K) | Varistor constant n | Current noise δ (%) | Resistivity aging characteristic (%) |
| | Thermistor characteristic powder | RuO₂ | Au | Glass frit | | | | | | |
|---|---|---|---|---|---|---|---|---|---|---|
| 1 | 20 | 7 | 3 | 70 | 3.5M | 14 | 900 | 1.04 | 2.0 | 1.6 |
| 2 | 10 | 20 | 20 | 50 | 350 | 13 | 20 | 1.00 | 2.0 | 1.0 |
| 3 | 20 | 12 | 18 | 50 | 5.0K | 12 | 850 | 1.00 | 1.5 | 1.1 |
| 4 | 40 | 3 | 7 | 50 | 18K | 13 | 3500 | 1.00 | 1.2 | 1.8 |
| 5 | 55 | 4 | 1 | 40 | 12K | 25 | 3900 | 1.10 | 7.0 | 4.0 |
| 6 | 20 | 35 | 15 | 30 | 5 | 10 | 850 | 1.00 | 1.0 | 1.5 |
| 7 | 20 | 24 | 36 | 20 | 5 | 10 | 350 | 1.00 | 0.5 | 1.0 |
| 8 | 30 | 15 | 35 | 20 | 9 | 12 | 3000 | 1.00 | 0.8 | 2.0 |
| 9 | 50 | 6 | 24 | 20 | 100 | 10 | 3400 | 1.02 | 1.1 | 1.5 |

Table 4-continued

| No. | Composition of thermistor powder (% by weight) | | | | Resistivity R (Ω) at 25° C. | Dispersion of resistivity (%) | Thermistor constant B (K) | Varistor constant n | Current noise δ (%) | Resistivity aging characteristic (%) |
|---|---|---|---|---|---|---|---|---|---|---|
| | Thermistor characteristic powder | RuO₂ | Au | Glass frit | | | | | | |
| 10 | 70 | 9 | 1 | 20 | 900 | 15 | 3950 | 1.04 | 1.2 | 1.4 |

As mentioned above, this invention can provide a thick film thermistor excellent in aging characteristic and high in accuracy which is characterized in that (1) a low resistivity of less than 1 KΩ can be obtained and thermistor element has a wide range of resistivity of about 1Ω-1MΩ, (2) dispersion of resistivity is within ±15%, (3) voltage-dependence of resisitivity is small and varistor constant is within the range of 1.00–1.05, (4) current noise is controlled to 2% or less and (5) resistivity aging characteristic is 2% or less.

What is claimed is:

1. A thermistor composition comprising a thermistor characteristic powder consisting of a reaction product obtained by solid phase reaction of MnO₂, CoO and NiO, a bismuth-containing lead borosilicate glass frit, an electrically conductive powder selected from the group consisting of a mixture of silver powder and ruthenium oxide powder and a mixture of gold powder and ruthenium oxide powder, characterized in that a mixing ratio of the thermistor characteristic powder, the glass frit and the electrically conductive powder is in the area of the qualrilateral ABCD in the accompanying triangular diagram of FIG. 1 and the amount of ruthenium oxide powder in the electrically conductive powder is 15–95% by weight of the total weight of the electrically conductive powder, with the vertexes A, B, C and D of the quadrilateral ABCD being the points showing the following compositions:

| | Thermistor characteristic powder (% by weight) | Electrically conductive powder (% by weight) | Glass frit (% by weight) |
|---|---|---|---|
| A | 20 | 10 | 70 |
| B | 70 | 10 | 20 |
| C | 30 | 50 | 20 |
| D | 20 | 50 | 30 |

2. A thermistor composition according to claim 1, wherein the bismuth-containing lead borosilicate glass frit comprises SiO₂, PbO, B₂O₃, BaO, CaO, Bi₂O₃ and Al₂O₃.

3. A thermistor composition according to claim 2, wherein the glass frit comprises, by weight, 24% of SiO₂, 23% of PbO, 20% of B₂O₃, 15% of BaO, 8% of CaO, 6% of Bi₂O₃ and 4% of Al₂O₃.

4. A thermistor composition according to claim 3, wherein the thermistor characteristic powder is a reaction product obtained by solid phase reaction of MnO₂, CoO and NiO in a molar ratio of 2:1:3.

5. A thermistor composition according to claim 3, wherein the thermistor characteristic powder is a reaction product obtained by solid phase reaction of MnO₂, CoO and NiO in a molar ratio of 2:3:1.

6. A thick film thermistor, characterized in that said thermistor comprises a ceramic substrate, a lower electrode formed on said substrate, a thermistor layer formed on said lower electrode and extending onto said substrate, and an upper electrode formed on said thermistor layer and extending onto the substrate, wherein said thermistor layer comprises a thermistor characteristic powder consisting of a reaction product obtained by solid phase reaction of MnO₂, CoO and NiO, a bismuth-containing lead borosilicate glass frit and an electrically conductive powder selected from the group consisting of a mixture of silver powder and ruthenium oxide powder and a mixture of gold powder and ruthenium oxide powder, with the mixing ratio of the thermistor characteristic powder, the glass frit and the electrically conductive powder in the area of the quadrilateral ABCD in the accompanying triangular diagram of FIG. 1 and the amount of the ruthenium oxide powder in the electrically conductive powder is 15–95% by weight of the total weight of the electrically conductive powder, the vertexes A, B, C and D of the quadrilateral ABCD being the points showing the following compositions:

| | Thermistor characteristic powder (% by weight) | Electrically conductive powder (% by weight) | Glass frit (% by weight) |
|---|---|---|---|
| A | 20 | 10 | 70 |
| B | 70 | 10 | 20 |
| C | 30 | 50 | 20 |
| D | 20 | 50 | 30 |

7. A thick film thermistor according to claim 5, wherein the bismuth-containing lead borosilicate glass frit comprises SiO₂, PbO, B₂O₃, BaO, CaO, Bi₂O₃ and Al₂O₃.

8. A thick film thermistor according to claim 7, wherein the glass frit comprises, by weight, 24% of SiO₂, 23% of PbO, 20% of B₂O₃, 15% of BaO, 8% of CaO, 6%, of Bi₂O₃ and 4% of Al₂O₃.

9. A thick film thermistor according to claim 8, wherein the thermistor characteristic powder is a reaction product obtained by solid phase reaction of MnO₂, CoO and NiO in a molar ratio of 2:1:3.

10. A thick film thermistor according to claim 8, wherein the thermistor characteristic powder is a reaction product obtained by solid phase reaction of MnO₂, CoO and NiO in a molar ratio of 2:3:1.

* * * * *